US012437427B2

United States Patent
Park et al.

(10) Patent No.: US 12,437,427 B2
(45) Date of Patent: Oct. 7, 2025

(54) GENERATION USING DEPTH-CONDITIONED AUTOENCODER

(71) Applicant: ADOBE INC., San Jose, CA (US)

(72) Inventors: Taesung Park, San Francisco, CA (US); Sylvain Paris, Jamaica Plain, MA (US); Richard Zhang, San Francisco, CA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 487 days.

(21) Appl. No.: 17/896,574

(22) Filed: Aug. 26, 2022

(65) Prior Publication Data

US 2024/0070884 A1   Feb. 29, 2024

(51) Int. Cl.
*G06V 10/00* (2022.01)
*G06T 5/50* (2006.01)
*G06T 7/40* (2017.01)

(52) U.S. Cl.
CPC ............. *G06T 7/40* (2013.01); *G06T 5/50* (2013.01); *G06T 2207/10028* (2013.01)

(58) Field of Classification Search
CPC .............. G06T 7/40; G06T 5/50; G06T 2207/10028; G06T 11/001
See application file for complete search history.

(56) References Cited

U.S. PATENT DOCUMENTS

| 2021/0097691 A1* | 4/2021 | Liu | G06V 10/764 |
| 2023/0252692 A1* | 8/2023 | Liu | G06T 3/18 |
| | | | 345/582 |

FOREIGN PATENT DOCUMENTS

| EP | 2230855 B1 * | 10/2014 | G06T 5/30 |
| GB | 2597111 A   * | 1/2022  | G06N 3/045 |

* cited by examiner

*Primary Examiner* — Vu Le
*Assistant Examiner* — Zaid Muhammad Saleh
(74) *Attorney, Agent, or Firm* — Shook Hardy & Bacon L.L.P.

(57) ABSTRACT

An image processing system uses a depth-conditioned autoencoder to generate a modified image from an input image such that the modified image maintains an overall structure from the input image while modifying textural features. An encoder of the depth-conditioned autoencoder extracts a structure latent code from an input image and depth information for the input image. A generator of the depth-conditioned autoencoder generates a modified image using the structure latent code and a texture latent code. The modified image generated by the depth-conditioned autoencoder includes the structural features from the input image while incorporating textural features of the texture latent code. In some aspects, the autoencoder is depth-conditioned during training by augmenting training images with depth information. The autoencoder is trained to preserve the depth information when generating images.

17 Claims, 11 Drawing Sheets

GENERATION USING DEPTH-CONDITIONED AUTOENCODER

BACKGROUND

In the field of digital image editing, machine-learning based approaches have opened up a new genre of image editing methods that were not possible with traditional approaches, by learning from vast visual datasets to synthesize visuals that do not exist in the original input image. Deep generative models have become increasingly effective at producing realistic images from randomly sampled seeds. These models, such as generative adversarial networks ("GANs"), have revolutionized digital image synthesis, enabling photorealistic rendering of complex phenomena such as landscapes, faces, and other object categories. Some models utilize deep neural networks to generate output digital images from input digital images by extracting and combining deep features of digital images.

SUMMARY

Some aspects of the present technology relate to, among other things, an image processing system that generates modified images using a depth-conditioned autoencoder. The depth-conditioned autoencoder generates a modified image from an input image such that the modified image maintains structural features of the input image while modifying textural features. Given an input image and depth information for the image, an encoder of the depth-conditioned autoencoder extracts a structure latent code that encodes local structural features of the input image. A generator of the depth-conditioned autoencoder generates a modified image using the structure latent code from the input image and a texture latent code that encodes textural features. The texture latent code can be, for instance, extracted from a second image or obtained from a repository of texture latent codes. The modified image generated by the depth-conditioned autoencoder includes the structural features from the input image while incorporating textural features of the texture latent code. In some aspects, the autoencoder is depth-conditioned during training by augmenting training images with depth information. The autoencoder is trained using one or more loss functions to preserve the depth information when generating images.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
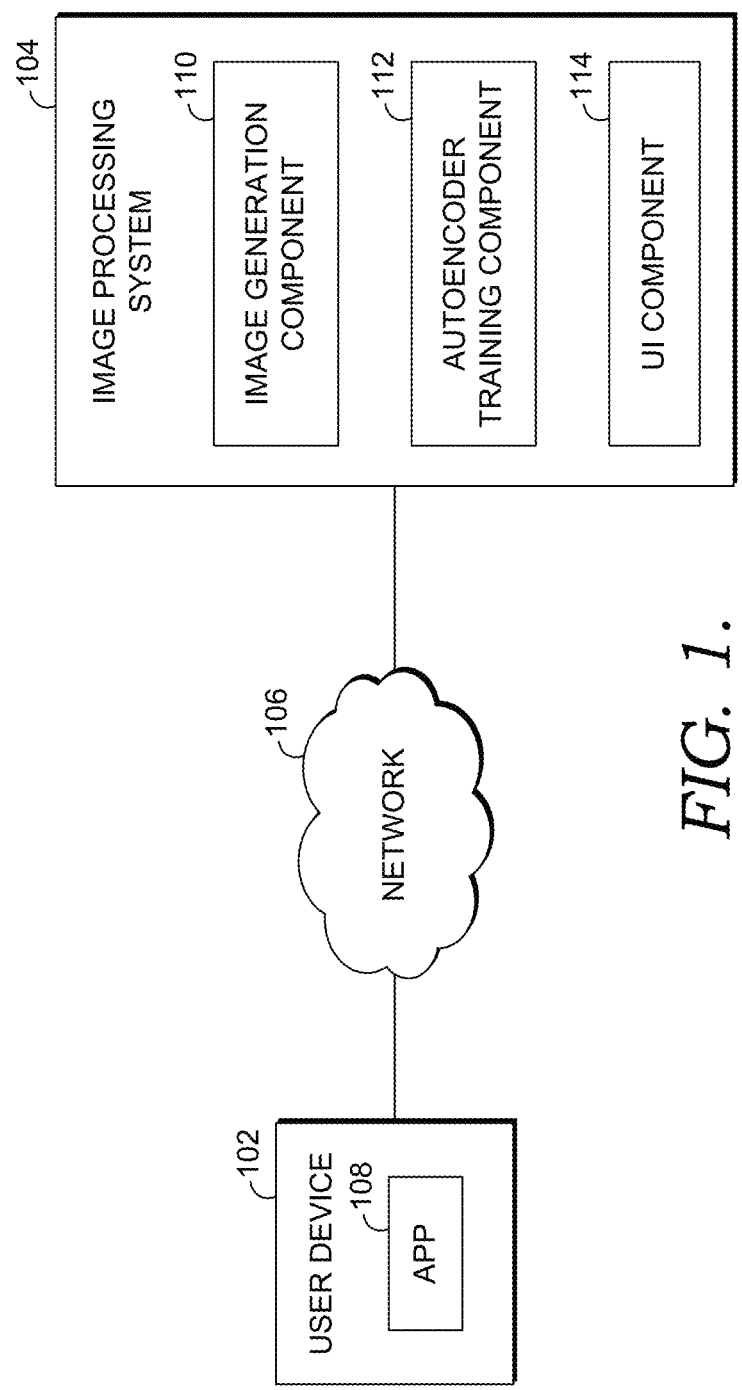
FIG. 1 is a block diagram illustrating an exemplary system in accordance with some implementations of the present disclosure.

Generative models, such as generative adversarial networks (GANs), can produce realistic images. However, there are limitations in the ability to control visual features of images generated by the models. For instance, some previous approaches provide deep network-based image editing models that can independently manipulate the structure and texture of user-provided high resolution input images at interactive speed. This allows visual changes to be made to images, such as changing the season or illumination of a scene. These previous approaches attempt to learn a disentangled manipulation of texture and structure in an unsupervised way, purely from unlabeled data. However, the lack of explicit supervision means the learned representation is not necessarily grounded in the true physical structure of the world. As a result, the outputs of these previous approaches often induce structural changes, such as making mountains disappear or changing the roofline of a building. This is undesirable because users often expect the underlying structure of the scene to be preserved. For example, if a user takes a photo of Yosemite and applies a snowy texture, the user expects the output to be the same scene (i.e. Yosemite) but as if taken in winter.

Aspects of the technology described herein improve the functioning of the computer itself in light of these shortcomings in existing technologies by depth-conditioning an autoencoder to generate modified images from input images without inducing undesirable structural changes. To depth-condition an autoencoder, training images are augmented with depth information, which serves as a representation of the underlying physical structure of the scene in the training images. The autoencoder is trained with the training images and associated depth information to generate images that preserve the depth information.

The depth-conditioned autoencoder includes one or more encoders for extracting structure latent codes and texture latent codes from images and their corresponding depth information. A structure latent code is a latent representation that encodes local structural features of an image. The structural features correspond to the geometry, relative positioning, and/or arrangement of various objects or portions of the image. A texture latent code is a latent representation that encodes global textural features. The textural features correspond to overall image properties or overall appearance. The textural features can represent an aesthetic of a scene, such as illumination, coloring, or shading.

Given an input image and depth information for the input image, the encoder of the depth-conditioned autoencoder extracts at least a structure latent code from the input image. A texture latent code is also accessed, for instance, from a repository of texture latent codes or extracted from a second image. Using the structure latent code from the input image and the texture latent code, the generator of the depth-conditioned autoencoder generates a modified image. The modified image incorporates the structural features of the input image (as encoded by the structure latent code extracted from the input image) and textural features encoded by the texture latent code.

Aspects of the technology described herein provide a number of improvements over existing technologies. For instance, depth information provides more effective conditioning for preserving structure, as this depth signal is actually explicitly related to the three-dimensional structure of the scene in an image. As such, the depth-conditioned autoencoder is able to more effectively disentangle structure and texture from images. Scene structure is preserved when generating modified images from input images. As a result, the depth-conditioned autoencoder is able to generate scene transformations that are more physically plausible than those generated using previous approaches.

Example System for Generating Modified Images Using Depth-Conditioned Autoencoder With reference now to the drawings, FIG. 1 is a block diagram illustrating an exemplary system 100 for generating modified images using a depth-conditioned autoencoder in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an image processing system 104. Each of the user device 102 and image processing system 104 shown in FIG. 1 can comprise one or more computer devices, such as the computing device 1100 of FIG. 11, discussed below. As shown in FIG. 1, the user device 102 and the image processing system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the image processing system 104 could be provided by multiple server devices collectively providing the functionality of the image processing system 104 as described herein. Additionally, other components not shown can also be included within the network environment.

The user device 102 can be a client device on the client-side of operating environment 100, while the image processing system 104 can be on the server-side of operating environment 100. The image processing system 104 can comprise server-side software designed to work in conjunction with client-side software on the user device 102 so as to implement any combination of the features and functionalities discussed in the present disclosure. For instance, the user device 102 can include an application 108 for interacting with the image processing system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the image processing system 104 remain as separate entities. While the operating environment 100 illustrates a configuration in a networked environment with a separate user device and image processing system, it should be understood that other configurations can be employed in which components are combined. For instance, in some configurations, a user device can also provide image processing capabilities.

The user device 102 comprises any type of computing device capable of use by a user. For example, in one aspect, the user device comprises the type of computing device 1100 described in relation to FIG. 11 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the image processing system 104 via the user device 102.

At a high level, the image processing system 104 employs a depth-conditioned autoencoder to generate modified images input images. As shown in FIG. 1, the image processing system 104 includes an image generation component 110, an autoencoder training component 112, and a user interface component 114.

The components of the image processing system 104 can be in addition to other components that provide further additional functions beyond the features described herein. The image processing system 104 can be implemented using one or more server devices, one or more platforms with corresponding application programming interfaces, cloud infrastructure, and the like. While the image processing system 104 is shown separate from the user device 102 in the configuration of FIG. 1, it should be understood that in other configurations, some or all of the functions of the image processing system 104 can be provided on the user device 102.

In one aspect, the functions performed by components of the image processing system 104 are associated with one or more applications, services, or routines. In particular, such applications, services, or routines can operate on one or more user devices, servers, can be distributed across one or more user devices and servers, or be implemented in the cloud. Moreover, in some aspects, these components of the image processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The image generation component 110 of the image processing system 104 generates a modified image from an input image such that the modified image maintains structural features of the input image while modifying textural features of the input image. The image generation component 110 generates a modified image based on a structure latent code extracted from an input image, depth information for the input image, and a texture latent code. In particular, the image generation component 110 utilizes a depth-conditioned autoencoder with a encoder and a generator. In some aspects, the encoder of the autoencoder is a neural network that extracts a structure latent code and a texture latent code from an input image. The structure latent code is a latent representation that encodes local structural features of the input image. The structural features correspond to the geometry, relative positioning, and/or arrangement of various objects or portions of the input image. The texture latent code is a latent representation that encodes global textural features of the input image. The textural features correspond to overall image properties or overall appearance of the input image. The textural features can represent an aesthetic of the scene in the input image, such as illumination, coloring, or shading. In some aspects, the generator of the autoencoder is a neural network that generates a modified image using the structure latent code from the input image and another texture latent code different from the texture latent code extracted from the input image.

Figure 2:
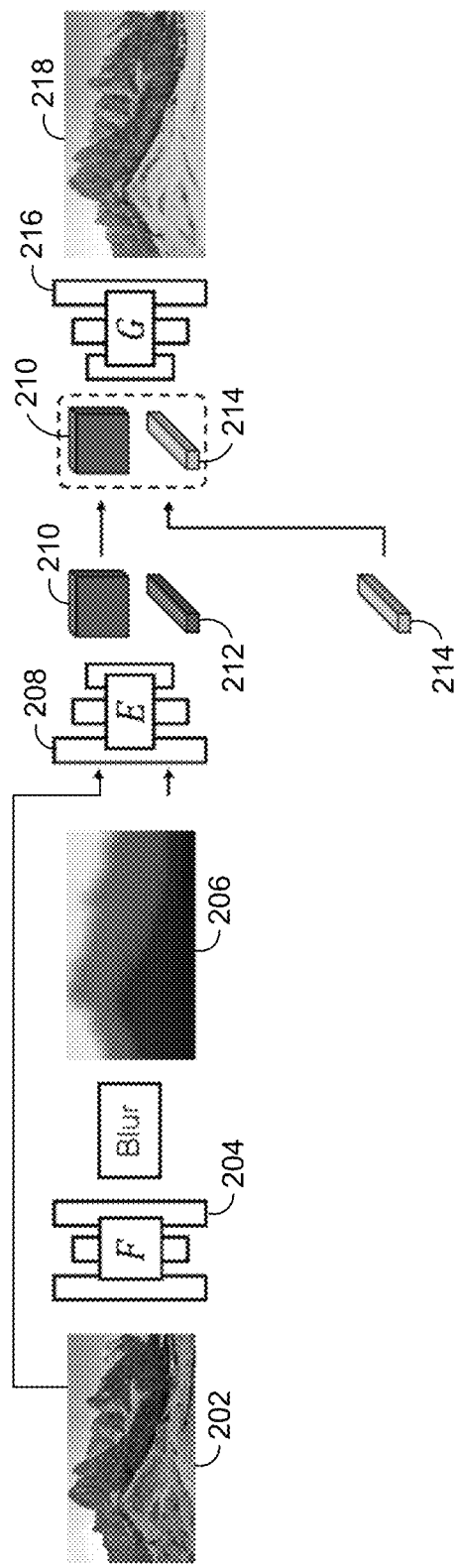
FIG. 2 is a block diagram illustrating an example generation of a modified image using a depth-conditioned autoencoder in accordance with some implementations of the present disclosure.

By way of illustration, FIG. 2 is a block diagram illustrating generation of a modified image (e.g., by the image generation component 110 of FIG. 1) using a depth-conditioned autoencoder in accordance with some aspects of the technology described herein. As shown in FIG. 2, the depth-conditioned autoencoder includes an encoder 208 and a generator 216 that generate a modified image 218 from an input image 202 using depth information 204 for the input image 202.

Initially, depth information 206 is derived from the input image 202 using a depth estimation model 204. As used herein, depth information (such as the depth information 206) can comprise a depth value for pixels of an image (such as the input image 202). For instance, depth information can be represented as a matrix that provides a depth value for each pixel representing how far the imaged object in that pixel is from the camera. As ground truth depth is typically unavailable for an arbitrary input image, embodiments can use a depth estimation model (e.g., a pre-trained neural network) to predict depth values for pixels of an image, using the predicted depth values as a proxy. Some configurations also blur the depth result (e.g., with a σ=32 Gaussian kernel, with kernel of size 192, spanning ±3σ) in order to give some degree of freedom such that structure is not perfectly preserved when performing texture transfer. This provides a blurred depth map that is used as depth information for the image.

Given the input image 202 and the depth information 206, the encoder 208 extracts a structure latent code 210 and a texture latent code 212 from the input image 202. The encoder 208 is applied to the input image 202 using the depth information 206 to extract structural features for the structure latent code 210 and textural features for the texture latent code 212. While the embodiment of FIG. 2 illustrates a single encoder 208 extracting the structure latent code 210 and the texture latent code 212, in some configurations, two separate encoders are used: a structural encoder to extract the structure latent code 210 and a textural encoder to extract the texture latent code 212.

As further illustrated in FIG. 2, the generator 216 generates the modified image 218 using the structure latent code 210 extracted from the input image 202 by the encoder 208 and a texture latent code 214 different from the texture latent code 212 extracted from the input image 202 by the encoder 208. As such, the generator 216 generates the modified image 218 to have the structure of the input image 202 (as represented by the structure latent code 210) and the textural appearance of the texture latent code 214. For instance, as shown in the example of FIG. 2, the modified image 218 maintains the mountains (i.e., structure) from the input image 202 while modifying the texture to show snow on the mountains.

The texture latent code (e.g., the texture latent code 214) used to generate a modified image (e.g., the modified image 218) can be provided in a number of different manners within the scope of embodiments of the present invention. In some configurations, a repository of texture latent codes is provided from which a user can select a texture latent code for use in generating a modified image from an input image. For example, in the context of landscape images, texture latent codes could be provide that each modify the texture of a landscape in a certain way, such as changing the appearance of the landscape (e.g., snowy, rocky, vegetated, etc.) or changing the lighting conditions (e.g., sunny, overcast, twilight, etc.). In some configurations, the texture latent code used to generate a modified image can be a modified version of the texture latent code extracted from the input image (e.g., the texture latent code 212 extracted from the input image 202). In further embodiments, the texture latent code is extracted from a second image. For instance, a user could provide two images—a first image from which structure is to be used and a second image from which texture is to be used. In further configurations, a user interface is provided that allows a user to specify or select certain textural features, and a texture latent code is generated or a pre-configured latent code is selected based on the user input.

Figure 3:
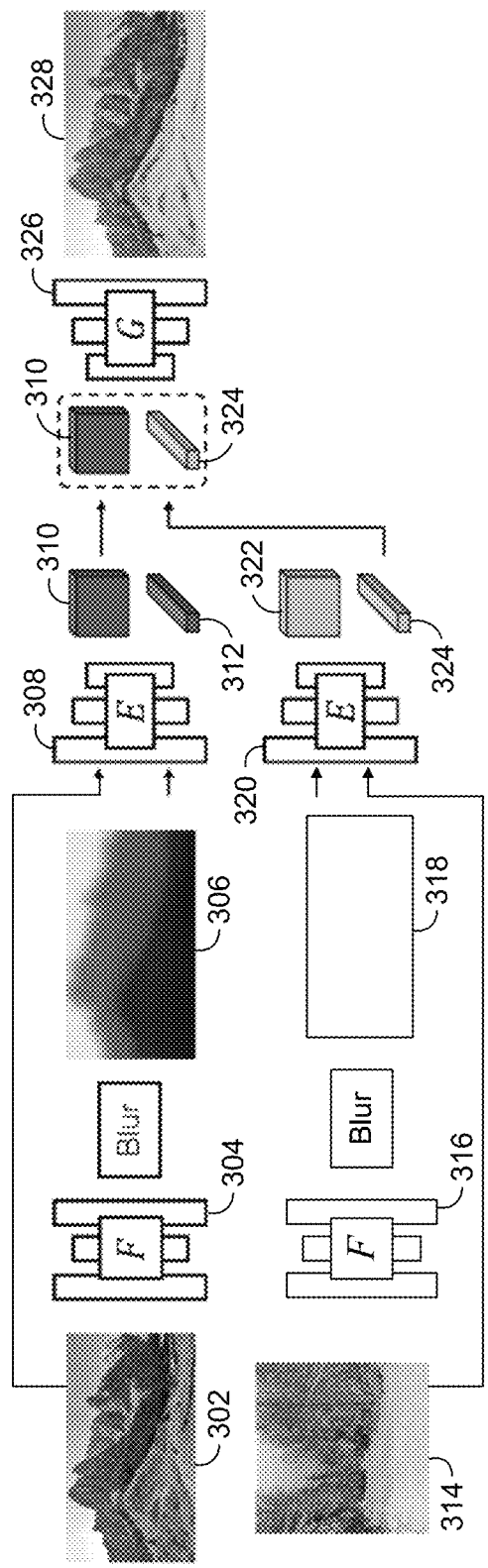
FIG. 3 is a block diagram illustrating another example generation of a modified image using a depth-conditioned autoencoder in accordance with some implementations of the present disclosure.

FIG. 3 is a block diagram providing an example illustrating generation of a modified image (e.g., by the image generation component 110 of FIG. 1) using a structure latent code from one image and a texture latent code from another image. In particular, FIG. 3 illustrates a depth-conditioned autoencoder generating a modified image 328 using structural features of a first image 302 and textural features of a second image 314.

As shown in FIG. 3, a depth estimation model 304 determines depth information 306 (e.g., a blurred depth map) for a first image 302. The first image 302 and the depth information 306 for the first image 302 are provided as input to an encoder 308. Using the first image 302 and the depth information 306, the encoder 308 extracts a structure latent code 310 and a texture latent code 312 for the first image 302.

Similarly, a depth estimation model 316 determines depth information 318 (e.g., a blurred depth map) for a second image 314. The second image 304 and the depth information 318 for the second image 314 are provided as input to an encoder 320. Using the second image 314 and the depth information 318, the encoder 320 extracts a structure latent code 322 and a texture latent code 324 for the second image 314.

As further illustrated in FIG. 3, a generator 326 generates the modified image 328 using the structure latent code 310 extracted from the first image 302 by the encoder 308 and the texture latent code 324 extracted from the second image 314 by the encoder 320. As such, the generator 326 generates the modified image 328 to have the structure of the first image 302 (as represented by the structure latent code 310) and the textural appearance of the second image 314 (as represented by the texture latent code 324). In particular, the modified image 328 shows the mountains (i.e., structure) based on the first image 302 modified to include snow (i.e., texture) based on the second image 304.

In some configurations, the depth estimation model 304 used to generate the depth information 306 for the first image 302 and the depth estimation model 316 used to generate depth information 318 for the second image 314 and are the same depth estimation model. However, in other configurations, different depth estimation models are used. Similarly, in some configurations, the encoder 320 used to extract latent codes from the second image 314 and the encoder 308 used to extract latent codes from the first image 302 are the same encoder. In other configurations, however, two different encoders are used. Additionally, while FIG. 3 illustrates an embodiment in which both the encoder 308 and the encoder 320 use depth information, in other configurations, only the encoder 308 uses depth information.

In addition to generating modified images by combining latent codes (e.g., combining structure latent code 210 and texture latent code 214 in FIG. 2; combining structure latent code 310 and texture latent code 324 in FIG. 3), the image processing system 104 can generate modified images by modifying latent codes to edit attributes or blend styles. In some embodiments, the image processing system 104 utilizes an autoencoder similar to that described by Taesung Park, Richard Zhang, Oliver Wang, Junyan Zhu, Jingwan Lu, Elya Shectman, and Alexei A. Efros in U.S. patent application Ser. No. 16/874,399 entitled Generating Modified Digital Images Utilizing a Swapping Autoencoder (2020), which is incorporated by reference herein in its entirety. In some cases, the autoencoder training component 112 modifies the autoencoder described by Park et al. by depth-conditioning utilizing depth information for training images and one or more different loss functions. Additional detail regarding the loss functions is provided below with reference to subsequent figures.

The image processing system 104 includes an autoencoder training component 112 for training a depth-conditioned autoencoder. In accordance with aspects of the technology described herein, the autoencoder training component 112 trains a depth-conditioned autoencoder using an image dataset of training images and depth information for at least a portion of the training images. In some cases, depth information is derived for training images during the training process. As previously noted, depth information for an image can comprise a depth value for pixels of the image. For instance, depth information can be represented as a matrix that provides a depth value for each pixel representing how far the imaged object in that pixel is from the camera. As ground truth depth is typically unavailable for an arbitrary input image, embodiments can use a depth estimation model (e.g., a pre-trained neural network) to predict depth values for pixels of an image, using the predicted depth values as a proxy. Some configurations also blur the depth result (e.g., with a $\sigma=32$ Gaussian kernel, with kernel of size 192, spanning $\pm 3\sigma$) in order to give some degree of freedom such that structure is not perfectly preserved when performing texture transfer. This provides a blurred depth map that is used as depth information for the image.

During training, the autoencoder training component 112 learns parameters (e.g., weights) for the depth-conditioned autoencoder such that the encoder of the autoencoder extracts structure latent codes and texture latent codes from images and the generator of the autoencoder generates modified images by combining structure latent codes and texture latent codes. Depth information for training images is used to depth-condition the autoencoder to preserve structure when generating modified images as the depth information provides a signal that is explicitly related to the three-dimensional structures of the scenes in images. The autoencoder training component 112 can train the autoencoder over a number of iterations in which at each iteration: the autoencoder generates a reconstructed image and/or modified image from a training image or pair of training images with associated depth information; the reconstructed image and/or modified image are assessed using one or more loss functions; and parameters (e.g., weights) of the autoencoder are updated based on the loss function(s). For instance, weights and/or other parameters of the encoder and generator of the autoencoder can be updated using back-propagation based on the results of the loss function(s) such that the encoder disentangles structure and text in structure latent code and texture latent code extracted from images and the generator generates modified images that are realistic and maintain desired structure and textural properties.

As will be described in further detail below, the autoencoder training component 112 uses one or more loss functions to train the depth-conditioned autoencoder on training images and associated depth information for the training images. In some configurations, the autoencoder training component 112 employs one or more loss functions associated with the autoencoder generating a reconstructed image from a training image. A reconstructed image comprises an image generated by the generator of the autoencoder using the structure latent code and texture latent code extracted from an input image using the encoder of the autoencoder. The one or more loss functions associated with reconstruction can comprise a reconstruction loss that encourages the autoencoder to generate a reconstructed image that appears similar, if not identical, to the input image. The one or more loss functions associated with reconstruction can comprise a reconstruction GAN loss using a discriminator on reconstructed images that encourages the autoencoder to generate realistic reconstructed images from input images.

In some configurations, the autoencoder training component 112 employs one or more loss functions associated with the autoencoder generating a modified image by swapping a structure latent code extracted from a first image with a texture latent code extracted from a second image. The one or more loss functions associated with swapping can comprise a swapping GAN loss using a discriminator on modified images that encourages the autoencoder to generate realistic modified images. The one or more loss functions associated with swapping can comprise a co-occurrence loss using a patch discriminator on patches from modified image and from the training image from which texture latent code was extracted and used to generate the modified image. This co-occurrence loss encourages the auto-encoder to extract texture latent code from an image such that modified images generated using the texture latent code maintain the same texture as the image.

Figure 4:
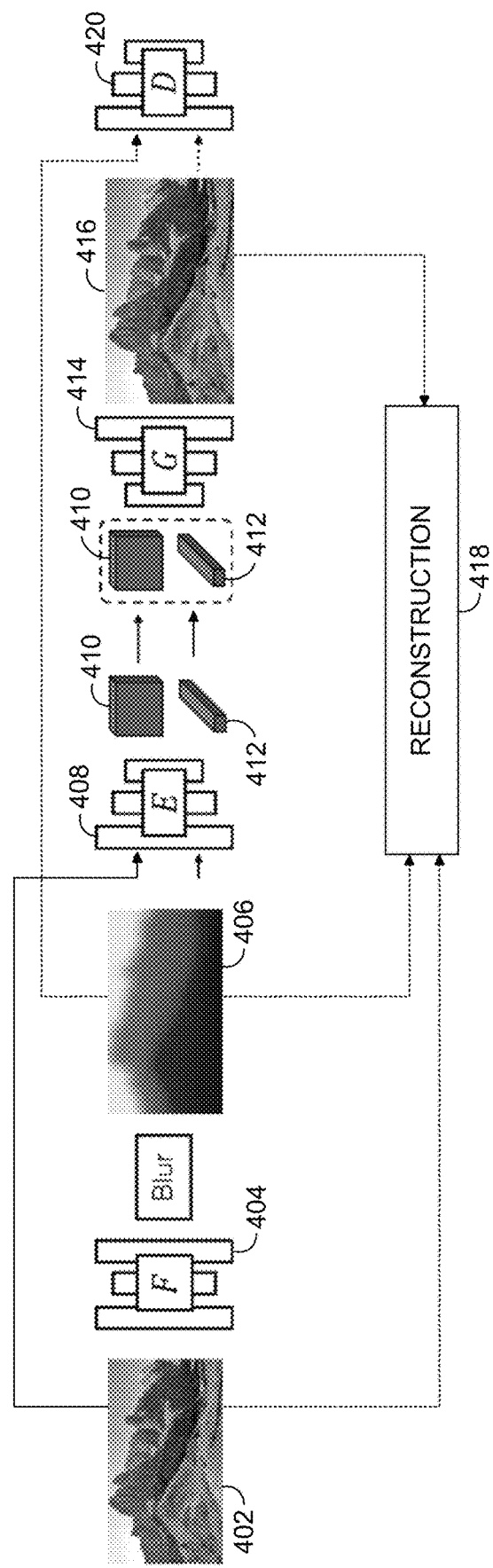
FIG. 4 is a block diagram illustrating learning parameters of an autoencoder associated with generating a reconstructed image from a training image in accordance with some implementations of the present disclosure.

Turning to FIG. 4, an example is provided that illustrates learning parameters associated with generating a reconstructed image 416 from a training image 402. As shown in FIG. 4, depth information 406 is generated for the training image 402 using a depth estimation model 404 and blurring the result, thereby providing a blurred depth map. It should be understood that alternative approaches to obtaining depth information for the training image 402 can be employed within the scope of embodiments of the present technology. An encoder 408 maps the training image 402 and the depth information 406 (e.g., the depth information 406 can be concatenated with the training image 402) to a latent space, and a generator 414 does the reverse by generating a reconstructed image 416 from the latent feature representation. In particular, encoder 408 maps the training image 402 and the depth information, respectively given by:

$$x \in \mathbb{R}_{H \times W \times 3}$$

$$z_d \in \{0,1\}_{H \times W \times 1}$$

where x represents the training image 402, H represents the height of the image, W represents the width of the image, 3 is the number of channels in an RGB image (i.e. red, green, and blue), and $z_d$ represents the depth information 406 for the training image 402. For example, the encoder 408 maps the training image 402 and its associated depth information 406 to a latent space Z, and the generator 414 generates the reconstructed image 416 from the encoding in the latent space Z. In some embodiments, the encoder 408 (E) includes or represents two different encoders: a structural encoder $E_s$ and a textural encoder $E_t$ that extract structure latent codes and texture latent codes, respectively.

During the training process, parameters of the encoder 408 and the generator 414, such as weights or other internal network parameters, are learned that enable the autoencoder to generate individual elements of latent code (e.g., structure latent codes versus texture latent codes) that represent disentangled factors of images such as the training image 402 (e.g., so that factors are not represented by both the structure latent codes and the texture latent codes). To more explicitly ensure this disentanglement, the autoencoder training component 112 factors the latent space Z into two components: a structure latent code 406 and a texture latent code 408. For example, the encoder of the autoencoder is trained to generate a structure latent code and texture latent code having the following forms, respectively:

$$z_s \in Z_s \sim \mathbb{R}_{H_s \times W_s \times C_s}$$

$$z_t \in Z_t \sim \mathbb{R}_{1 \times 1 \times C_t}$$

where $z_s$ represents a structure latent code (e.g., the structure latent code 410), z t represents a texture latent code (e.g., the texture latent code 412), $Z_s$ represents a structural component of the latent space Z, $Z_t$ represents a textural component of the latent space Z, $H_s$ represents a height of the structure latent code, $W_s$ represents a width of the structure latent code, $C_s$ represents a length of the structure latent code, and $C_t$ represents a length of the texture latent code. Some embodiments implement a texture latent code length $C_t$=1024, a structure latent code length $C_s$=1 or 2, and a spatial dimensionality of 32 or 64, depending on the dataset of training images.

To learn the parameters that enable the autoencoder to generate the reconstructed image 416 as an accurate representation of the training image 402, the autoencoder training component 112 utilizes one or more loss functions over a number of iterations with training images. With each iteration of using a training image to generate a reconstructed image as part of the parameter learning, the autoencoder training component 112 utilizes loss functions to modify internal parameters of the encoder 408 and/or the generator 414.

More specifically, for successive iterations, the autoencoder training component 112 utilizes loss functions to evaluate a performance of the autoencoder by determining an error or a measure of loss associated with generating a reconstructed image (e.g., the reconstructed image 416) from a training image (e.g., the training image 402). The autoencoder training component 112 further modifies various weights or other internal parameters of the autoencoder based on the error or measure of loss utilizing gradient-based backpropagation. Thus, over multiple iterations of analyzing training images, generating corresponding reconstructed images, determining measures of loss, and modifying internal parameters of the encoder 408 and/or the generator 414 to reduce the loss, the autoencoder training component 112 tunes the encoder 408 and the generator 414 to accurately generate reconstructed images from input images.

Relating to the loss functions, the autoencoder training component 112 utilizes a reconstruction loss to compare a reconstructed image (e.g., the reconstructed digital image 416) with the training image (e.g., the training image 402) from which the reconstructed image was generated by the autoencoder. In some embodiments, without incorporating depth information, the autoencoder training component 112 utilizes a reconstruction loss in the form of:

$$\mathcal{L}_{rec,img}(E,G) = \mathbb{E}_{x \sim X}[\|x - G(E_s(x)E_t(x))\|_1]$$

where $\mathcal{L}_{rec,img}(E, G)$ represents the reconstruction loss between a reconstructed image (e.g., the reconstructed image 416) and a training image (e.g., the training image 402) associated with the encoder 408 (E) and the generator 414 (G), x represents a training image (e.g., the training image 402) as defined above, X denotes a training image distribution, $E_s$ represents a structural encoder (e.g., as defined above), and E t represents a textural encoder (e.g., as defined above).

In some cases, the above reconstruction loss function is expressed as:

$$\mathcal{L}_{rec,img}(E,G) = \mathbb{E}_{x \sim X}[\|x - G(E(x))\|_1]$$

where E represents the encoder 408 and includes the structural encoder $E_s$ and the textural encoder $E_t$.

In accordance with aspects of the technology described herein, the above reconstruction loss function is modified to accommodate the incorporation of depth information for a training image (e.g., the depth information 406 for the training image 402). Accordingly, the autoencoder training component 112 employs a reconstruction loss 418 that modifies the above loss function to have the form:

$$\mathcal{L}_{rec,img}(E,G) = \mathbb{E}_{x \sim X}[\|x - G(E_s(x,z_d)E_t(x,z_d))\|_1] \text{ or}$$

$$\mathcal{L}_{rec,img}(E,G) = \mathbb{E}_{x \sim X}[\|x - G(E(x,z_d))\|_1]$$

where $z_d = F(x)$ is the proxy depth of training image x.

In addition to the reconstruction loss function, the autoencoder training component 112 can also utilize a reconstruction GAN loss associated with a discriminator 420. During training, the autoencoder training component 112 implements a discriminator 420 in competition with the generator 414. The generator 414 generates reconstructed images (e.g., the reconstructed image 416) from training images (e.g., the training image 402), and the discriminator 420 attempts to distinguish generated reconstructions from actual stored data (e.g., from a digital image repository). To enforce that depth is not ignored by the generator 414, the discriminator 420 is also condition on depth information associated with training images. For example, based on the training image 402 and its associated depth information 406, the encoder 408 generates latent codes (e.g., structure latent code 410 and texture latent code 412), and the generator 414 generates the reconstructed image 418. The depth information 406 is provided with the reconstructed image 418 to the discriminator 420. In turn, the discriminator 420 compares the concatenated information (e.g., the reconstructed image 418 with the depth information 406) with an actual digital image from a database concatenated with its corresponding depth to identify or select which concatenated image is real.

In some embodiments, the autoencoder training component 112 utilizes the reconstruction GAN loss to train the autoencoder to generate reconstructed images (e.g., the reconstructed image 416) to look realistic. Along with (or as part of) the reconstruction GAN loss, the autoencoder training component 112 simultaneously trains the discriminator 420 to identify if an image is generated by the generator 416 or is from a real dataset. For example, the autoencoder training component 112 utilizes a reconstruction GAN loss given by:

$$\mathbb{R}_{GAN,rec}(E,G,D) = \mathbb{E}_{x \sim X}[-\log(D(G(E(x,z_d)),z_d))]$$

where $\mathbb{R}_{GAN,rec}(E, G, D)$ represents the reconstruction GAN loss for reconstructing images, D represents the discriminator neural network 420, and the remaining terms are as defined above. As shown, the reconstruction GAN loss is an adversarial loss. In some embodiments, the deep image manipulation system jointly trains the discriminator neural network 420 with a simplified gradient penalty regularization $\mathbb{E}_{x \sim X}\|\nabla D(x)\|_2$ and a default weight of 10.

By utilizing the reconstruction loss 418 and the reconstruction GAN loss associated with the discriminator 420, the autoencoder training component 112 determines how accurate the autoencoder is when generating reconstructed images and is able to improve the accuracy over subsequent iterations. For instance, the autoencoder training component 112 continues training the encoder 408 and the generator 414 over multiple iterations, inputting new training images to generate new reconstructed images, determining losses, and modifying parameters for each iteration. Thus, upon determining that the reconstruction loss 418 and/or the reconstruction GAN loss associated with the discriminator 420 satisfy a threshold loss, the autoencoder training component 112 determines that the encoder 408 and the generator 414 are accurate. By combining the structure latent code 410 and the texture latent code 412 extracted by the encoder 408, the generator 414 generates the reconstructed image 416 to accurately represent the training image 402 such that the reconstructed image 416 looks very similar, if not identical, to the training image 402.

Figure 5:
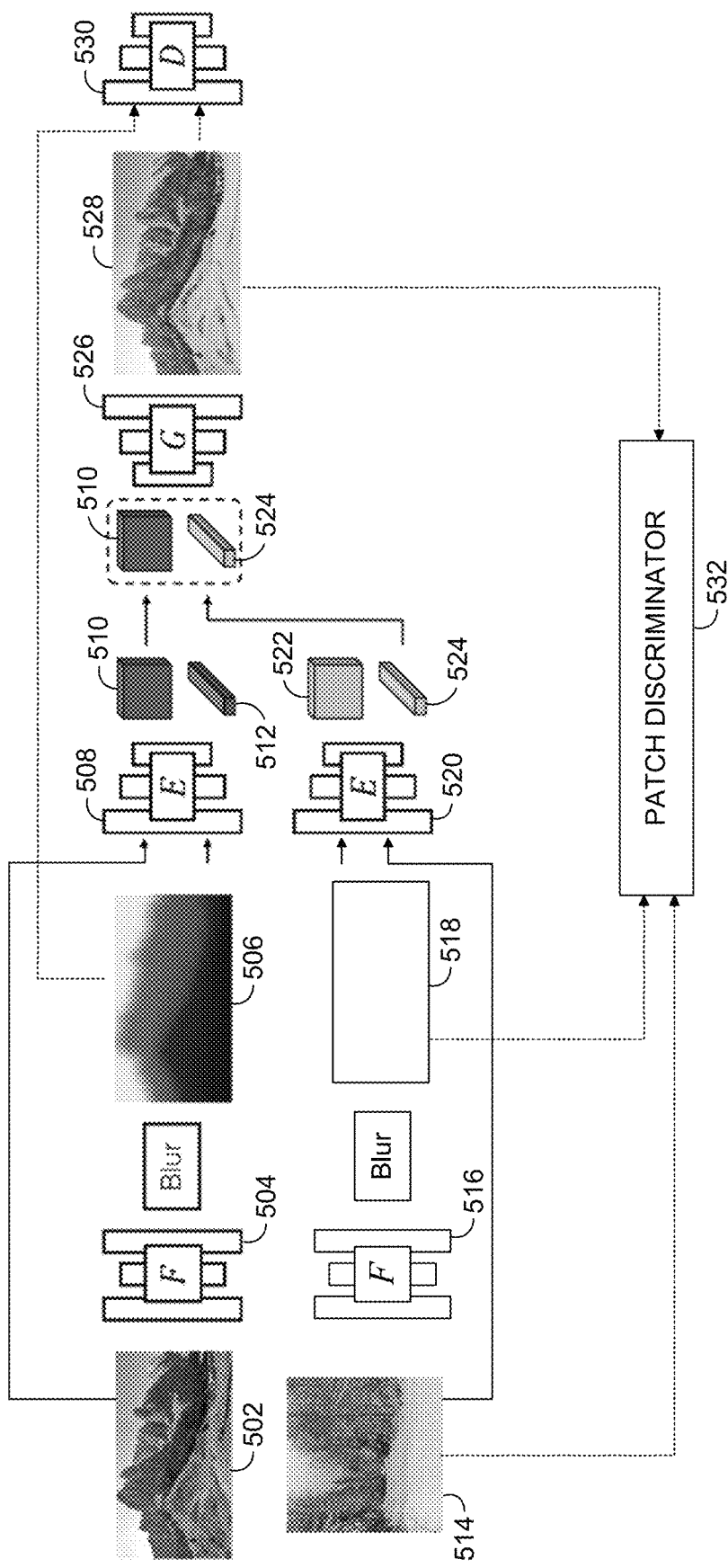
FIG. 5 is a block diagram illustrating learning parameters of an autoencoder associated with generating a modified image from a pair of training images in accordance with some implementations of the present disclosure.

FIG. 5 illustrates learning parameters associated with generating a modified image 528 from a first training image 502 and a second training image 514—i.e., swapping latent codes between a pair of training images. As shown in FIG. 5, depth information 506 is generated for the first training image 502 using a depth estimation model 504 and blurring the result, thereby providing a blurred depth map for the first training image 502. Similarly, depth information 518 is generated for the second training image 514 using a depth estimation model 516 (which can be the same as the depth estimation model 504) and blurring the result, thereby providing a blurred depth map for the second training image 514. It should be understood that alternative approaches to obtaining depth information for the training images 502 and 514 can be employed within the scope of embodiments of the present technology. An encoder 508 extract a structure latent code 510 and a texture latent code 512 from the first training image 502 and its associated depth information 506. In addition, an encoder 520 (which can be the same as the encoder 508) extracts a structure latent code 522 and a texture latent code 524 from the second training image 514 and its associated depth information 518. The generator 526 combines the structure latent code 510 from the first training image 502 with the texture latent code 524 from the second training image 514 to produce the modified image 528.

To encourage the generation of realistic modified images, the autoencoder training component 112 utilizes a swapping GAN loss associated with a discriminator 530 to determine an error or a measure of loss associated with the autoencoder swapping structure latent codes and texture latent codes from different training images. In particular, the autoencoder training component 112 utilizes a swapping GAN loss given by:

$$\mathbb{R}_{GAN,swap}(E,G,D) = \mathbb{E}_{x^1,x^2 \sim X, x^i \sim x^2}[-\log(D(G(z_s^1,z_t^2,z_d^1),z_d^1))]$$

where $\mathbb{R}_{GAN,swap}(E, G, D)$ represents the swapping GAN loss, $x^1$ represents the first training image 502, $x^2$ represents the second training image 514, $z_s^1$ represents the structure latent code 510 from the first training image 502, $z_t^2$ represents the texture latent code 524 from the second training image 514, $z_d^1$ represents the depth information for the first training image 502, and the other terms are defined above. Using this swapping GAN loss, the autoencoder training component 112 causes the discriminator 530 to determine whether a modified image (e.g., the modified image 528) with depth information from the training image from which structure was taken (e.g., the depth information 506 for the first training image 502) is real.

In one or more embodiments, utilizing this swapping GAN loss alone may not be enough for the autoencoder training component 112 to constrain the autoencoder to generate a hybrid of two images that incorporates the structure of one image and the texture of another image, as the swapping GAN loss is related only to the realism of the resultant modified image. Thus, to improve the generation of modified images, the autoencoder training component 112 utilizes an additional loss function called a co-occurrence loss. In particular, the autoencoder training component 112 utilizes a co-occurrence loss to learn parameters of the autoencoder for extracting latent codes that represent structure and texture and for generating modified images that maintain the structure and texture. For example, the autoencoder training component 112 encourages the texture latent code z t to maintain the same texture in any modified images generated using that texture latent code. In some embodiments, the autoencoder training component 112 utilizes a patch co-occurrence discriminator 532 to determine whether individual sampled patches are real (e.g., from a stored digital image) or generated (e.g., from a modified image from the autoencoder).

Thus, the autoencoder training component 112 trains the autoencoder to extract latent codes (e.g., $z_s^1$, $z_t^2$) and generate a modified image (e.g., the modified image 528) such that the texture of any patch from the generated modified image cannot be distinguished from the texture of a group of patches from the training image from which structure was taken (e.g., the second training image 514). In some embodiments, the autoencoder training component 112 utilizes a co-occurrence loss having the form:

$$\mathbb{R}_{Cooccur,GAN}(E,G,D_{patch}) = \mathbb{E}_{x^1,x^2,x}[-\log(D_{patch}(\text{crop}(G(z_s^1,z_t^2,z_d^1),z_d^1),\text{crops}(x^2,z_d^2)))]$$

where $\mathbb{R}_{Cooccur,GAN}(E, G, D_{patch})$ represents the co-occurrence loss, crop(.) selects a random patch (e.g., of size ⅛ to ¼ of the full image dimension on each side), crops(.) is a collection of multiple patches, and the remaining terms are as defined above. Utilizing this co-occurrence loss function, the autoencoder training component 112 ensures that corresponding patches (e.g., patches in corresponding locations) in modified images from the autoencoder (e.g., the modified image 528) have the same or similar texture to those of the 1 image from which a texture latent code is extracted (e.g., the second training image 514).

In one or more embodiments, the autoencoder training component 112 utilizes an objective function to learn parameters for the encoder and the generator using, for instance, the loss functions discussed above. For example, the autoencoder training component 112 utilizes an objective function given by:

$$\mathcal{L}_{total} = \mathcal{L}_{rec} + 0.05 \mathcal{L}_{GAN,rec} + 0.05 \mathcal{L}_{GAN,swap} + \mathcal{L}_{Cooccur,GAN}$$

where the terms are as defined above.

The image processing system 104 further includes a user interface component 114 that provides one or more user interfaces for interacting with the image processing system. The user interface component 114 provides user interfaces to a user device, such as the user device 102 (which includes the application 108 for interacting with the image processing system 104). For instance, the user interface component 114 can provide user interfaces for, among other things, submitting input images for modified image generation, presenting modified images generated by the depth-conditioned autoencoder, selecting texture latent codes, and/or modifying latent codes.

Figure 6:
FIG. 6 is a diagram with images providing examples of modified images generated using a depth-conditioned autoencoder in accordance with some implementations of the present disclosure.

FIG. 6 provides examples showing modified images generated by swapping latent codes from images. In particular, the first column 602 provides an input image to be modified from which structure is extracted (referred to herein as a "structure image"). The second column 604 provides an image from which texture is extracted for modifying the input image in the first column 602 (referred to herein as a "texture image"). The third column 606 provides a modified image generated by a previous approach using the structure image from the first column 602 and the texture image from the second column 604. The fourth column provides a modified image generated by an embodiment of the present technology using the structure image from the first column 602 and the texture image from the second column 604. As can be seen from FIG. 6, the modified images from the previous approach (i.e., column 606) and the modified images from the present technology (i.e., column 608) include the texture from the corresponding texture image. However, the modified images from the previous approach (i.e., column 606) are unable to adequately maintain the structure from the corresponding structure image. In particular, the modified images from the previous approach (i.e., column 606) is generated with mountains that are distorted—flatter— than those shown in the corresponding structure image. In contrast, the modified images using the present technology (column 608) maintain the structure of the mountains from the corresponding structure image.

Figure 7:
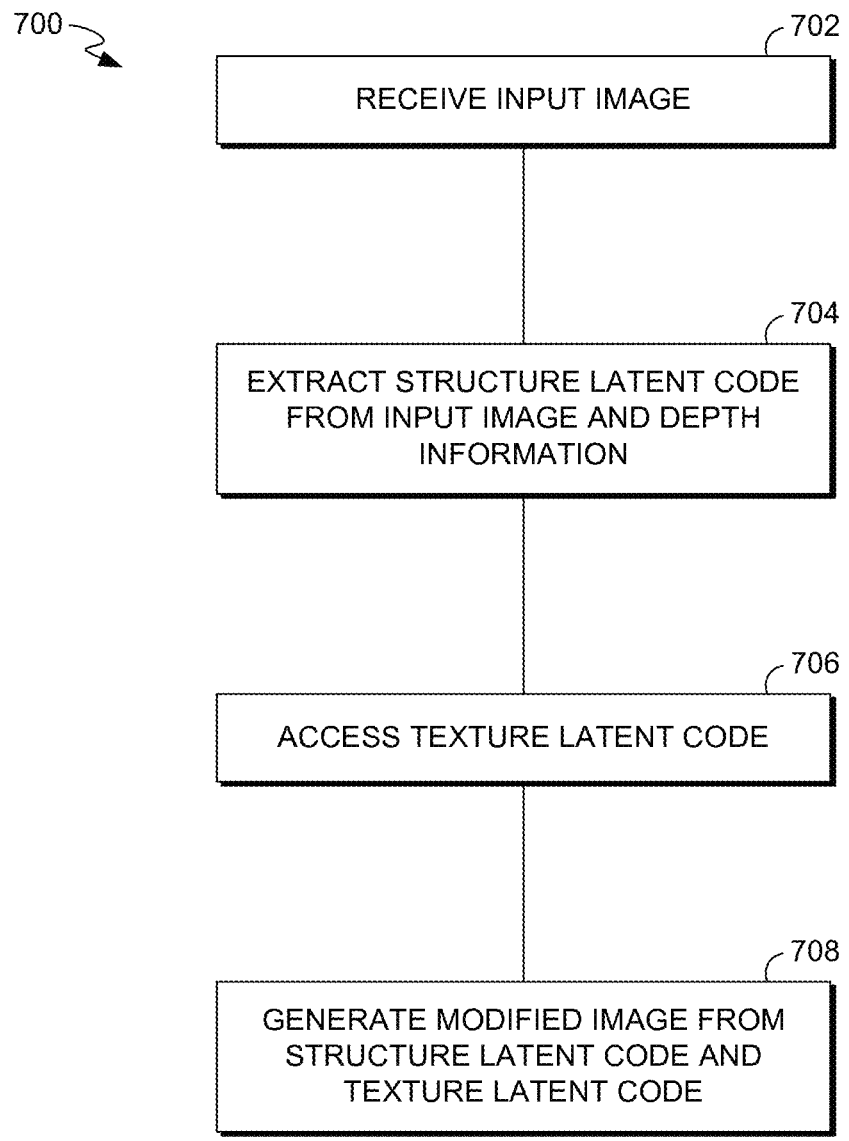
FIG. 7 is a flow diagram showing a method for generating a modified image using a depth-conditioned autoencoder in accordance with some implementations of the present disclosure.

Example Methods for Generating Modified Images Using Depth Conditioned Autoencoder With reference now to FIG. 7, a flow diagram is provided that illustrates a method 700 for generating a modified image using a depth-conditioned autoencoder The method 700 can be performed, for instance, by the image generation component 110 of FIG. 1. Each block of the method 700 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 702, an input image is received. This is an image from which a modified image will be generated by modifying the texture of the input image, while maintaining the structure of the input image. The input image can be received, for instance, by a user selecting or otherwise submitting the input image via a user interface.

A structure latent code is extracted from the input image and depth information for the input image by an encoder of a depth-conditioned autoencoder, as shown at block 704. The depth information for the input image can comprise depth values associated with pixels of the input image. In some instances, a depth estimation model is used to predict depth values for the input image. The predict depth values can also be blurred in order to give some degree of freedom such that structure is not perfectly preserved when performing texture transfer.

A texture latent code is accessed, as shown at block 706. The texture latent code can be access in a number of different manners. For instance, in some cases, the texture latent code is selected from a repository of pre-configured texture latent codes. In some cases, the texture latent is a modified version of a texture latent code extracted from the input image by the encoder of the depth-conditioned autoencoder. In some aspects, the texture latent code is extracted from a second image by the encoder of the depth-conditioned autoencoder.

As shown at block 708, a modified image is generated from the structure latent code and the texture latent code by a generator of the depth-conditioned autoencoder. As such, the modified image is generated with the structure from the input image and the texture of the texture latent code. The modified image can be provided for presentation to a user. In some configurations, the system facilitates further modification to the modified image. For instance, a user interface can be provided that allows the user to adjust certain structure and/or textural features of the modified image. Based on the input, the structure latent code and/or the texture latent code are modified and a new modified image generated by the generator of the depth-conditioned autoencoder.

Figure 8:
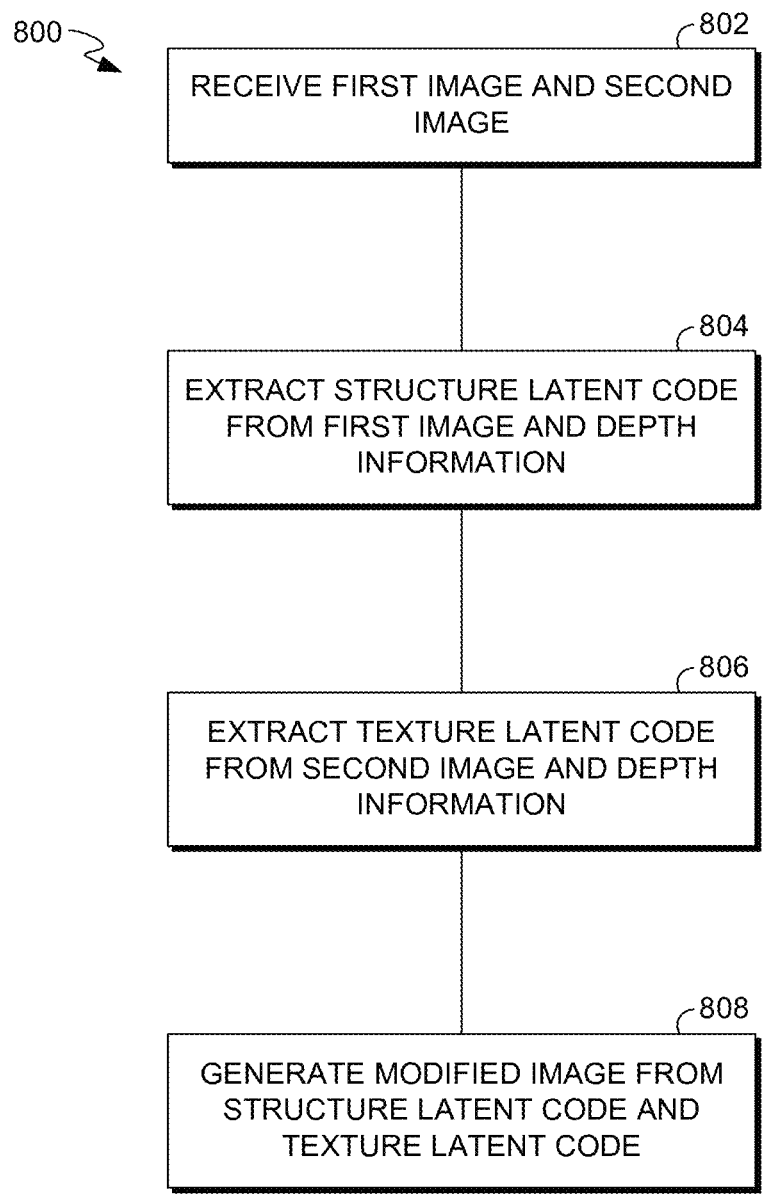
FIG. 8 is a flow diagram showing another method for generating a modified image using a depth-conditioned autoencoder in accordance with some implementations of the present disclosure.

FIG. 8 provides a flow diagram showing another method 800 for generating a modified image using a depth-conditioned autoencoder. The method 800 can be performed, for instance, by the image generation component 110 of FIG. 1. As shown at block 802, first image and a second image are retrieved. The first image is an image from which structure will be extracted for generating a modified image, while the second image is an image from which texture will be extracted for generating the modified image. The first and second images can be received, for instance, by a user selecting or otherwise submitting the images via a user interface.

A structure latent code is extracted from the first image and depth information for the first image by an encoder of a depth-conditioned autoencoder, as shown at block 804. Additionally, a texture latent code is extracted from the second image and depth information for the second image by the encoder of the depth-conditioned autoencoder, as shown at block 806. The depth information for each image can comprise depth values associated with pixels of the image. In some instances, a depth estimation model is used to predict depth values for each image. The predicted depth values can also be blurred in order to give some degree of freedom such that structure is not perfectly preserved when performing texture transfer.

As shown at block 808, a modified image is generated from the structure latent code and the texture latent code by a generator of the depth-conditioned autoencoder. As such, the modified image is generated with the structure from the first image and the texture of the second image. The modified image can be provided for presentation to a user. In some configurations, the system facilitates further modification to the modified image. For instance, a user interface can be provided that allows the user to adjust certain structure and/or textural features of the modified image. Based on the input, the structure latent code and/or the texture latent code are modified and a new modified image generated by the generator of the depth-conditioned autoencoder.

Figure 9:
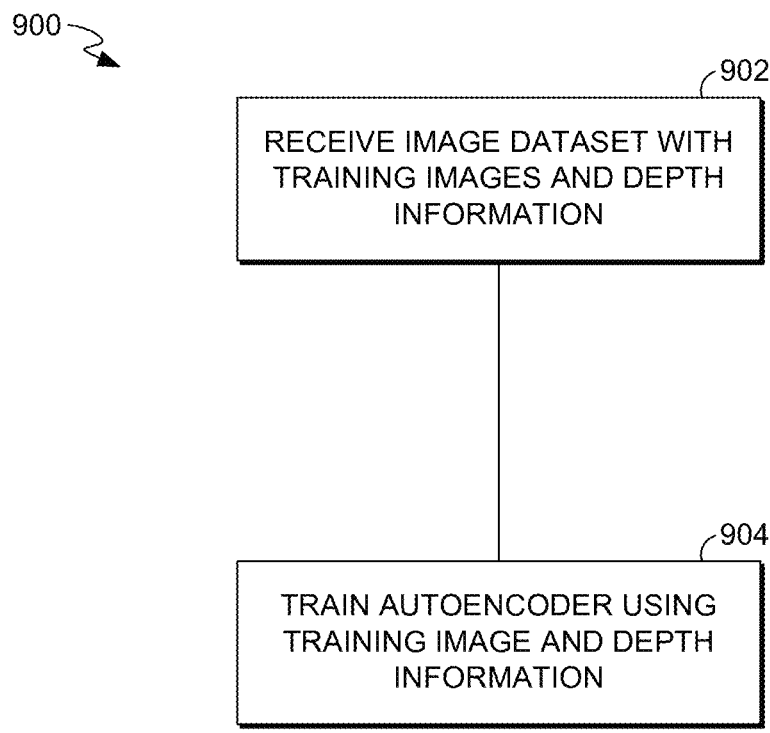
FIG. 9 is a flow diagram showing a method for training a depth-conditioned autoencoder in accordance with some implementations of the present disclosure.

Turning next to FIG. 9, a flow diagram is provided showing a method 900 for training a depth-conditioned autoencoder. The method 900 can be performed, for instance, by the autoencoder training component 112 of FIG. 1. As shown at block 902, an image dataset is received with training images and depth information for at least a portion of the training images. The depth information for each training image can comprise depth values associated with pixels of the training image. In some instances, a depth estimation model is used to predict depth values for each training image. The predicted depth values can also be blurred in order to give some degree of freedom such that structure is not perfectly preserved when performing texture transfer.

An autoencoder is trained using the training images and associated depth information, as shown at block 904. The autoencoder is trained over a number of iterations in which at each iteration: the autoencoder generates a reconstructed image and/or modified image from a training image or pair of training images with associated depth information; the reconstructed image and/or modified image are assessed using one or more loss functions; and parameters (e.g., weights) of the autoencoder are updated based on the loss function(s). For instance, weights and/or other parameters of the encoder and generator of the autoencoder can be updated using backpropagation based on the results of the loss function(s) such that the encoder disentangles structure and text in structure latent code and texture latent code extracted from images and the generator generates modified images that are realistic and maintain desired structure and textural properties. Depth information is concatenated with training images during the training process to depth-condition the autoencoder such that structure from an input image is preserved when generating a modified image from the input image.

Figure 10:
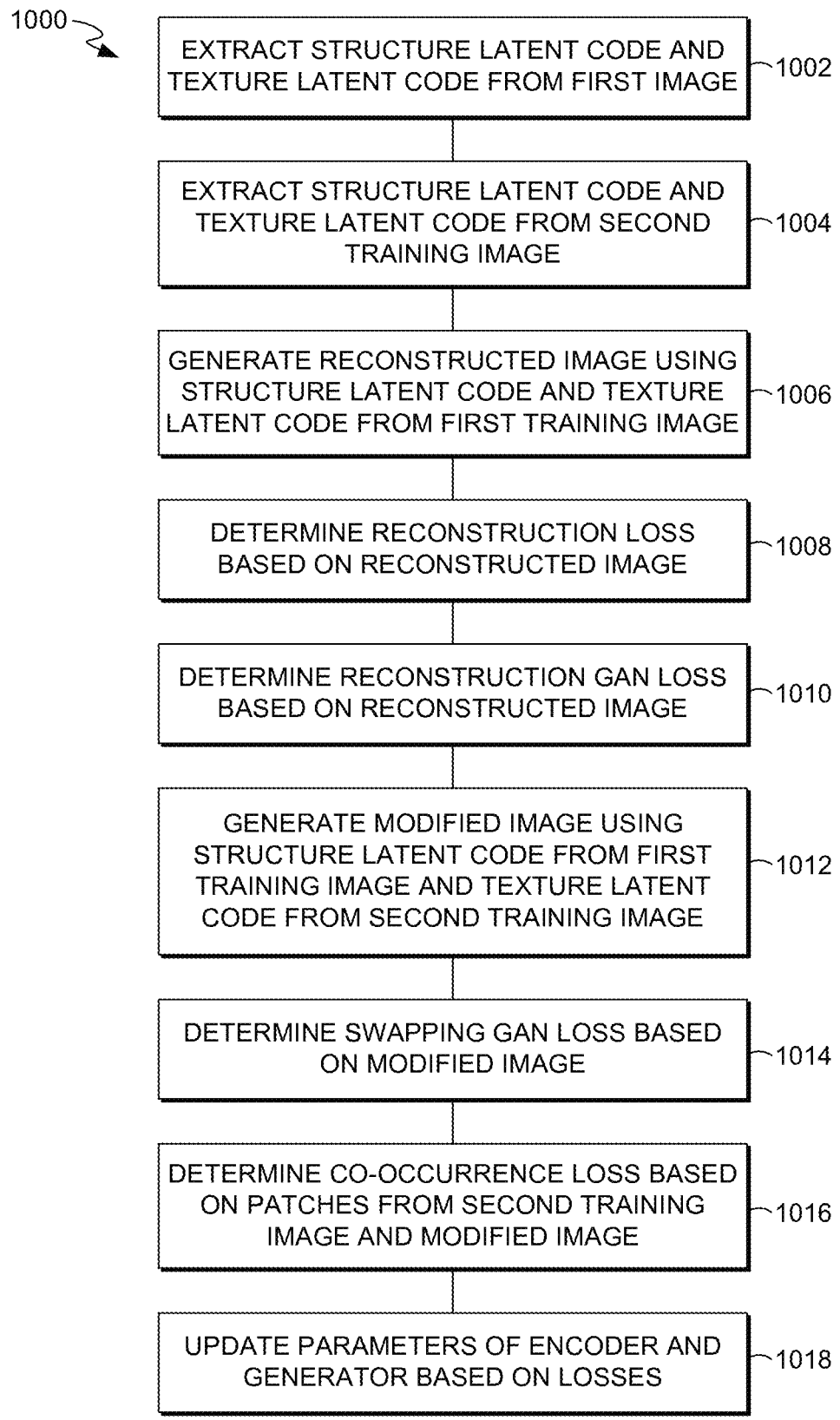
FIG. 10 is a flow diagram showing another method for training a depth-conditioned autoencoder in accordance with some implementations of the present disclosure.

FIG. 10 provides a flow diagram showing another method 1000 for training a depth-conditioned autoencoder. The method 1000 can be performed, for instance, by the autoencoder training component 112 of FIG. 1. In particular, the method 1000 comprises one iteration of training the depth-conditioned autoencoder using a pair of training images. As shown at block 1002, a structure latent code and texture latent code are extracted from a first training image and its associated depth information. Additionally, at block 1004, a structure latent code and texture latent code are extracted from a second training image and its associated depth information. A reconstructed image is generated for the first training image using the structure latent code and the texture latent code of the first training image, as shown at block 1006. A reconstruction loss is determined at block 1008 based on a comparison of the reconstructed image and the first training image (e.g., using the reconstruction loss function defined above). Additionally, a reconstruction GAN loss associated with a discriminator is determined based on the reconstructed image, as shown at block 1010 (e.g., using the reconstruction GAN loss function defined above).

A modified image is generated using the structure latent code from the first training image and the texture latent code from the second training image, as shown at block 1012. A swapping GAN loss associated with a discriminator is determined based on the modified image, as shown at block 1014 (e.g., using the sapping GAN loss function defined above). Additionally, a co-occurrence loss is determined at block 1016 based on patches from the second training image and the modified image (e.g., using the co-occurrence loss function defined above). As shown at block 1016, parameters of the encoder and generator of the autoencoder are updated (e.g., using backpropagation) based on losses determined at blocks 1008, 1010, 1014, and 1016.

Exemplary Operating Environment

Figure 11:
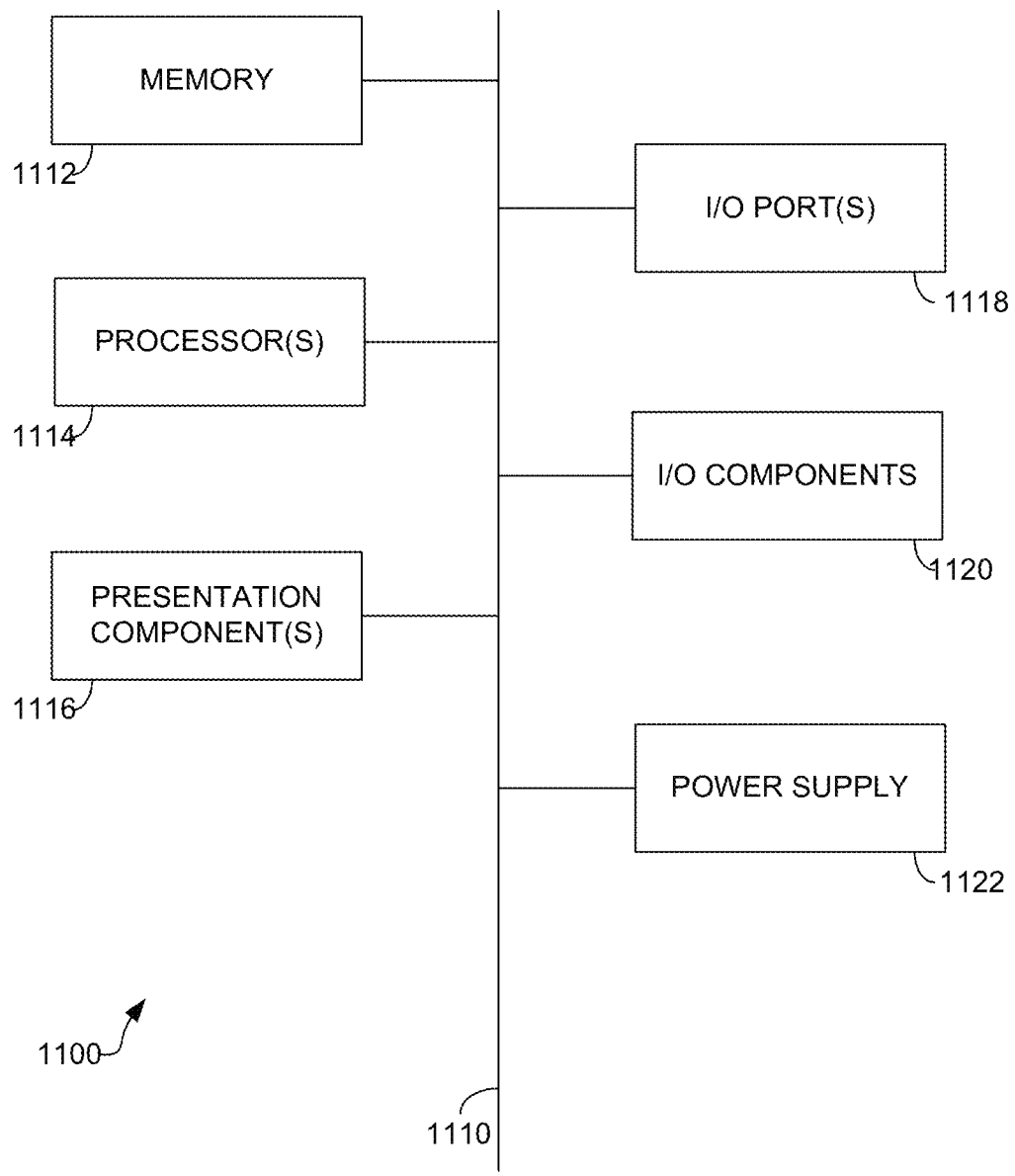
FIG. 11 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 11 in particular, an exemplary operating environment for implementing embodiments of the present technology is shown and designated generally as computing device 1100. Computing device 1100 is but one example of a suitable computing environment and is not intended to suggest any limitation as to the scope of use or functionality of the technology. Neither should the computing device 1100 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what can be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory can be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which can be built in. Illustrative components include a microphone, joystick, game pad, satellite dish, scanner, printer, wireless device, etc. The I/O components 1120 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 can be equipped with depth cameras, such as, stereoscopic camera systems, infrared camera systems, RGB camera systems, and combinations of these for gesture detection and recognition. Additionally, the computing device 1100 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   extracting, by an encoder of an autoencoder, a structure latent code from a first image and depth information for the first image, the structure latent code encoding local structural features of the first image;
   extracting, by the encoder of the autoencoder, a texture latent code from a second image and depth information for the second image, the texture latent code encoding global textural features of the second image; and
   generating, by a generator of the autoencoder, a third image using the structure latent code and the texture latent code.

2. The one or more computer storage media of claim 1, wherein the operations further comprising:
   generating the depth information for the first image by using a depth estimation model to predict depth values for pixels from the first image; and
   generating the depth information for the second image by using the depth estimation model to predict depth values for pixels from the second image.

3. The one or more computer storage media of claim 1, wherein the depth information for the first image comprises a first depth image having depth values for pixels of the first depth image, the depth values of the first depth image predicted by a depth estimation model using the first image, and wherein the depth information for the second image comprises a second depth image having depth values for pixels of the second depth image, the depth values predicted by the depth estimation model using the second image.

4. The one or more computer storage media of claim 3, wherein the first depth image and the second depth image are blurred.

5. The one or more computer storage media of claim 1, wherein the structure latent code is modified to provide a modified structure latent code prior to generating the third image, and wherein generating the third image using the structure latent code comprises generating the third image using the modified structure latent code.

6. The one or more computer storage media of claim 1, wherein the texture latent code is modified to provide a modified texture latent code prior to generating the third image, and wherein generating the third image using the texture latent code comprises generating the third image using the modified texture latent code.

7. A computer system comprising:
   a processor; and
   a computer storage medium storing computer-useable instructions that, when used by the processor, causes the computer system to perform operations comprising:
   receiving an image dataset of training images and depth information for at least a portion of the training images; and
   training an autoencoder using the training images and depth information to generate a trained autoencoder including an encoder and a generator, the encoder mapping an input image and depth information for the input image to a structure latent code, the generator mapping the structure latent code for the input image and a texture latent code to an output image, wherein training the autoencoder includes an iteration that comprises:
      extracting, using the encoder, a first structure latent code and a first texture latent code from a first training image and first depth information for the first training image,
      extracting, using the encoder, a second structure latent code and a second texture latent code from a second training image and second depth information for the second training image,
      generating, using the generator, a reconstructed image from the first structure latent code and the first texture latent code,
      generating, using the generator, a modified image from the first structure latent code and the second texture latent code, determining one or more losses based on the reconstructed image and the modified image, and updating parameters of the autoencoder based on the one or more losses.

8. The computer system of claim 7, wherein the one or more losses comprise a reconstruction loss based on a difference between the first training image with the first depth information and the reconstructed image.

9. The computer system of claim 7, wherein the one or more losses comprise a reconstruction generative adversarial network (GAN) loss associated with a discriminator based on the reconstructed image.

10. The computer system of claim 7, wherein the one or more losses comprise a swapping generative adversarial network (GAN) loss associated with a discriminator based on the modified image.

11. The computer system of claim 7, wherein the one or more losses comprise a co-occurrence loss associated with a discriminator based on patches from the second training image and the modified image.

12. A computer-implemented method comprising:

extracting, by an encoder of an autoencoder, a structure latent code from a first image and depth information for the first image, the structure latent code encoding local structural features of the first image;

extracting, by the encoder of the autoencoder, a texture latent code from a second image and depth information for the second image, the texture latent code encoding global textural features of the second image; and generating, by a generator of the autoencoder, a third image using the structure latent code and the texture latent code.

13. The computer-implemented method of claim 12, wherein the operations further comprising:

generating the depth information for the first image by using a depth estimation model to predict depth values for pixels from the first image; and generating the depth information for the second image by using the depth estimation model to predict depth values for pixels from the second image.

14. The computer-implemented method of claim 12, wherein the depth information for the first image comprises a first depth image having depth values for pixels of the first depth image, the depth values of the first depth image predicted by a depth estimation model using the first image, and wherein the depth information for the second image comprises a second depth image having depth values for pixels of the second depth image, the depth values predicted by the depth estimation model using the second image.

15. The computer-implemented method of claim 14, wherein the first depth image and the second depth image are blurred.

16. The computer-implemented method of claim 12, wherein the structure latent code is modified to provide a modified structure latent code prior to generating the third image, and wherein generating the third image using the structure latent code comprises generating the third image using the modified structure latent code.

17. The computer-implemented method of claim 12, wherein the texture latent code is modified to provide a modified texture latent code prior to generating the third image, and wherein generating the third image using the texture latent code comprises generating the third image using the modified texture latent code.

* * * * *